ns with novel 2-styryla-
United States Patent Office
3,401,048
Patented Sept. 10, 1968

3,401,048
2-STYRYLAZOLE OPTICAL BRIGHTENER
Ichiro Okubo, Hachioji-shi, and Michihiro Tsujimoto, Tachikawa-shi, Japan, assignors to Mitsui Kagaku Kogyo Kabushiki Kaisha (Mitsui Chemical Industry Co., Ltd.), Tokyo, Japan, a corporation of Japan
No Drawing. Filed June 18, 1965, Ser. No. 465,206
Claims priority, application Japan, June 22, 1964, 39/35,150, 39/35,242; Apr. 8, 1965, 40/20,292; May 13, 1965, 40/28,093
22 Claims. (Cl. 117—33.5)

The present invention concerns with novel 2-styrylazole compounds which are useful as optical brightener, and provides a process for optical brightening of organic fibrous material using such compounds. The 2-styrylazole compounds of this invention are novel compounds discovered by us and are represented by the general formula I below.

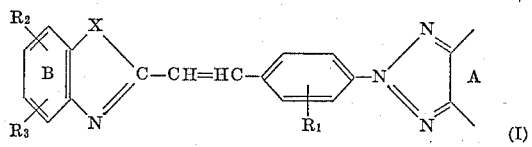

In the above Formula I, A is a member selected from the group consisting benzene nucleus, naphthlene nucleus and acenaphthene nucleus fused on the 1,2,3-triazole ring as shown at the 4,5-position, and when A stands for the benzene nucleus, it is substituted by at least one member of the group consisting of alkyl group and alkoxy group of 1–4 carbon atoms. $R_1$ is a member of the group consisting of hydrogen, chlorine and methyl group; $R_2$ and $R_3$ are each a member of the group consisting of hydrogen, chlorine, alkyl group of 1–8 carbon atoms, alkoxy group 1–4 carbon atoms, phenyl and cyclohexyl; and $R_2$ and $R_3$ may together form tetramethylene group bonded with the benzoxazole ring at the 4,5-position; X is a member selected from the group consisting of oxygen and sulphur; and B stands for benzene nucleus.

Among the compounds represented by the Formula I, those which are useful may also be expressed as follows.

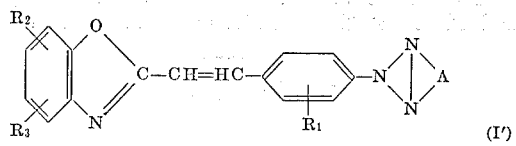

In the Formula I', A is a member selected from the group consisting of di-lower alkyl-o-phenylene group, di-lower alkoxy-o-phenylene group, lower alkyl-lower alkoxy-o-phenylene group, 1,2-naphthylene group and 4,5-acenaphthenylene group; $R_1$ is a member of the group consisting of hydrogen, chlorine and methyl group; $R_2$ and $R_3$ are each a member of the group consisting of hydrogen, chlorine, alkyl group of 1–8 carbon atoms, alkoxy group of 1–4 carbon atoms, phenyl and cyclohexyl; and $R_2$ and $R_3$ may together form cyclotetramethylene group bonded with the benzoxazole ring at the 4,5-position.

Among the compounds within the scope of the general Formula I', particularly useful compounds are those represented by the Formula I" below;

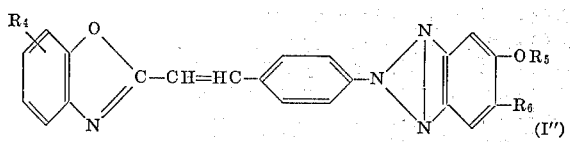

wherein $R_4$ stands for an alkyl group of 1–8 carbon atoms, and $R_5$ and $R_6$ each stands for an alkyl group of 1–4 carbon atoms as well as those represented by the Formula I''' below.

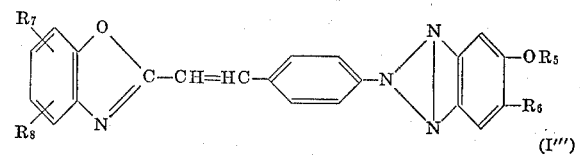

in which $R_5$ and $R_6$ have the significance defined in the above; $R_7$ and $R_8$ each stands for an alkyl group of 1–8 carbon atoms, and may together form cyclotetramethylene group bonded with the benzoxazole ring at the 4,5-position.

The novel 2-styrylazole compounds represented by the foregoing Formula I of the present invention are heretofore entirely unknown. We synthesized many of the novel 2-styrylazole compounds within the scope of the Formula I and made a thorough examination of their properties to find out that those novel compounds possess remarkable fluorescence-emitting property, and that organic fibrous material can be treated with these novel compounds with excellent optical brightening effect.

Accordingly, the object of the present invention is to provide novel 2-styrylazole compounds represented by the foregoing general Formula I which are useful as optical brightener, as well as to provide a process for optical brightening of organic fibrous material using such compounds.

The other objects will become apparent from the reading the following description.

The optical brightening process of this invention is effective with organic fibrous material, of example, fibers made of artificial polymer such as cellulose acetate, polyamide, polyester and polyolefin and shows particularly conspicious brightening effect on polyester and polyolefin fibers with notable light-fastness. Furthermore, the compounds used in this invention can remarkably brighten not only unmodified polyolefin fibers but also modified polyolefin fibers, for example, dyeable polypropylene fibers incorporated with nickel or aluminum.

It may be emphasized that among the 2-styrylazole compounds represented by the general Formula I with which the present invention concerns, 2-styryloxazole compounds in which X is oxygen have particularly excellent brightening effect compared with 2-styrylthiazole or 2-styrylimidazole compounds in which X is sulphur or HN.

Again in the general Formula I, A is preferably benzene nucleus substituted by lower alkyl or alkoxy group of 1–4 carbon atoms, methyl, ethyl, methoxy and ethoxy groups being the particularly preferred substituents. In case A is naphthalene nucleus, it is fused at its 1,2-position with the triazole ring at the 4,5-position. Whereas, when it is acenaphthene nucleus, it is fused at its 4,5-position with the triazole ring at the 4,5-position.

The one or two alkyl groups which may be contained in the benzene nucleus B in the Formula I may be of straight chain or branched, containing 1–8 carbon atoms, for example, methyl, ethyl, n-propyl, isopropyl, n-butyl, sec-butyl, tert-butyl, n-pentyl, iso-pentyl, n-hexyl, isohexyl, n-heptyl, n-octyl, tert-octyl, 2-ethyl-hexyl groups and the like. And, the one or two alkoxy groups which may be contained in the benzene nucleus B are those containing 1–4 carbon atoms, preferably methoxy and ethoxy groups. Still further, the benzene nucleus B may also contain cyclic hydrocarbon group such as phenyl and cyclohexyl, and cyclotetramethylene group fused on the benzene nucleus as bonded with the adjacent carbons in the said benzene nucleus. The halogen atoms which may be contained in the benzene nucleus B are chlorine, bromine and fluorine, preferably chlorine.

The compounds represented by the general Formula I which are useful in this invention contain no water-solubility-imparting group and the styryl moieties of them are bonded with aryltriazole derivative residues. The compound particularly useful for brightening of polypropylene fibrous material is that which contains benzene nucleus as the aryl of the aryltriazole derivative portion.

The novel 2-styrylazole compounds represented by the general Formula I of the present invention show excellent optical brightening effect upon polyolefin-type synthetic fibers, and are noteworthy for the surprising superiority of their brightening effect compared with that of heretofore known compounds. For example, 2,5-di(benzoxazolyl) thiophene compound represented by the Formula II below is known as effective for optical brightening of polyolefin-type synthetic fibers (cf. Belg. Pat. 612,774). Whereas, when its performance as to polypropylene fibers is compared with that of the compound No. 2 within the scope of the novel 2-styrylazole compound of this invention as shown in the later-appearing Table 1, it can be observed that the brightening effect of the latter far excels that of the former. To wit, when the quantitative ratios of the fluorescent brighteners to the fibers are successively increased, i.e., when the concentrations of the brighteners are varied from low to high, the maximum whiteness attainable with the use of the latter is in all cases exceedingly higher than the respective values obtained with the former. Furthermore, it can be also recognized that the amount of the latter required to attain the highest possible whiteness is one-fourth or less of that of the former. These facts well affirm the superiority of this invention.

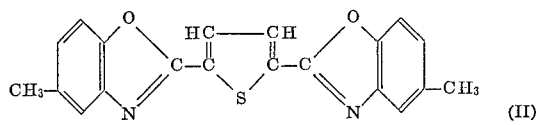

The novel 2-styrylazole compound with which this invention concerns can be prepared, for example, by diazotizing 2-(4'-aminostyryl)benzazole compound represented by the Formula III:

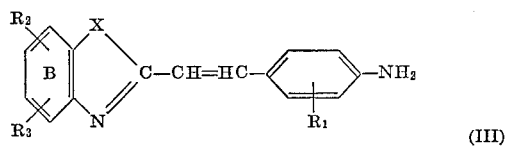

in which B, $R_1$, $R_2$, $R_3$ and X each has the significance as defined as to the B, $R_1$, $R_2$, $R_3$ and X of the Formula I, respectively, coupling the diazotized product with aniline derivative, naphthylamine or aminoacenaphthene which are capable of providing o-aminoazo compound corresponding to A of the Formula I to form o-aminoazo compound represented by the Formula IV below:

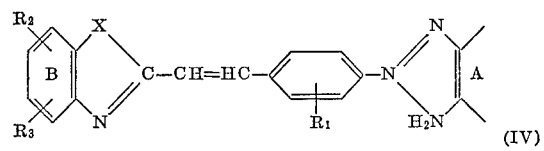

in which B, $R_1$, $R_2$, $R_3$ and X each has the significance as defined as to the B, $R_1$, $R_2$, $R_3$ and X of the Formula I, respectively, and A stands for benzene nucleus, naphthalene nucleus or acenaphthene nucleus corresponding to the A of the Formula I, and thereafter oxidatively ring-closing them to form triazole ring.

The diazotization of the amino compound represented by the Formula III can be performed by adding slightly excessive sodium nitrite to hydrochloric acid solution or suspension of the amino compound, according to the accepted practice. Whereas, the diazotization reaction can be more smoothly advanced if at that time the amino compound is first dissolved in acetic acid, and to the resultant solution hydrochloric acid and sodium nitrite are added. As the diazotized compound is thus obtained in the solution form, it is subjected to the subsequent coupling reaction in that state, without intervening isolation step. The diazotization reaction is performed at 15° C. or below, preferably at 0–5° C.

After completion of the diazotization reaction, the excessive nitrous acid is decomposed with sulphamic acid or urea, followed by the coupling reaction performed with the addition of the amine coupling component corresponding to A of the Formula IV at the same temperature. Thereby the o-aminoazo compound represented by the Formula IV is obtained as precipitate. In that case, it is recommendable that the amine component be added as an aqueous solution of hydrochloride thereof, or an acetic acid solution. Also during the coupling reaction it is necessary to add sodium acetate to the system to neutralize the mineral acid.

The said precipitate is separated by filtration, of which excessive amine being subsequently washed off with acid, and then is subjected to the following oxidative cyclizing reaction. The cyclizing or ring-closing reaction is recommendably performed in aqueous or organic medium, preferably at about 100° C. under reflux. Particularly satisfactory result can be obtained when soluble copper complex with pyridine is used as the oxidizing agent. It is desirable that the resultant reaction product should be purified by means of recrystallization from organic solvent such as o-dichlorobenzene or trichlorobenzene. As the oxidizing agent, for example, cuprammonium sulphate; copper sulphate or acetate in the form of a soluble complex with pyridine or picolines; and hypochlorites may be used. Thionyl or sulphuryl chloride is likewise useful.

The 2-(4'-aminostyryl)-benzazole compound represented by the Formula III can readily be prepared by, for example, the process comprising dehydration-condensation of 2-methylbenzazole compound of the Formula V

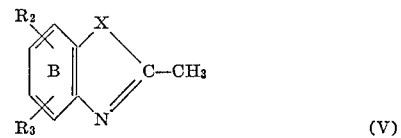

in which B, $R_2$, $R_3$ and X each has the significance as defined as to the Formula I with p-nitrobenzaldehyde or derivatives thereof represented by the Formula VI

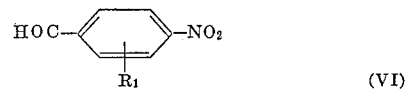

in which $R_1$ has the significance as defined as to the Formula I to form 2-(4'-nitrostyryl)-benzazole compound represented by the Formula VII

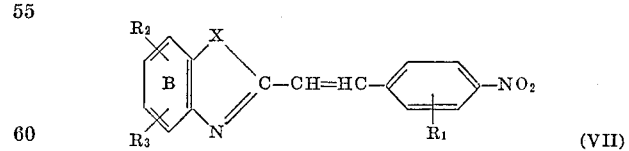

in which B, $R_1$, $R_2$, $R_3$ and X each has the significance as defined as to the Formula I, and the subsequent reduction thereof.

As more specific examples of the 2-(4'-aminostyryl)-benzazole compounds represented by the Formula III, the following may be named.

2-(4'-aminostyryl)-benzoxazole
2-(4'-aminostyryl)-5-methylbenzoxazole
2-(4'-aminostyryl)-6-methylbenzoxazole
2-(4'-aminostyryl)-7-methylbenzoxazole
2-(4'-aminostyryl)-5-ethylbenzoxazole
2-(4'-aminostyryl)-5-n-propylbenzoxazole
2-(4'-aminostyryl)-5-iso-propylbenzoxazole
2-(4'-aminostyryl)-5-tert.-butylbenzoxazole 2-(4'-aminostyryl)-5-tert.-octylbenzoxazole
2-(4'-aminostyryl)-5-methoxybenzoxazole
2-(4'-aminostyryl)-5-phenylbenzoxazole
2-(4'-aminostyryl)-5-cyclohexylbenzoxazole
2-(4'-aminostyryl)-4,5-cyclotetramethylenebenzoxazole
2-(4'-aminostyryl)-5-chlorobenzoxazole
2-(4'-aminostyryl)-5,6-dimethylbenzoxazole
2-(4'-aminostyryl)-5,7-dimethylbenzoxazole
2-(4'-aminostyryl)-5-ethyl-6-methylbenzoxazole
2-(4'-amino-2'-methylstyryl)-benzoxazole
2-(4'-amino-2'-methylstyryl)-5-methylbenzoxazole
2-(4'-amino-2'-chlorostyryl)-benzoxazole
2-(4'-amino-2'-chlorostyryl)-5-methylbenzoxazole
2-(4'-aminostyryl)-benzothiazole
2-(4'-amino-2'-chlorostyryl)-benzothiazole
2-(4'-aminostyryl)-6-methylbenzothiazole
2-(4'-aminostyryl)-6-methoxybenzothiazole Again, examples of such amino compounds which are capable of producing o-aminoazo compounds corresponding to A of the Formula I in the preparation of the compounds of the Formula IV include:

3,4-dimethylaniline
3,4-dimethoxyaniline
3-methoxy-4-methylaniline
3-ethoxy-4-methylaniline
2-naphthylamine
5-aminoacenaphthene.

Another process for preparing the 2-styrylazole compound represented by the Formula I of this invention comprises dehydration-condensation of 2-methylbenzazole compound of the above Formula V with 4-[1',2',3'-triazolyl-(2')]-benzaldehyde derivative of the Formula VIII below

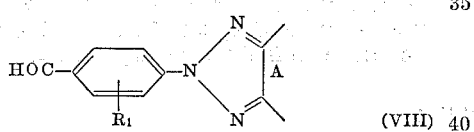

(VIII)

in which A and $R_1$ each has the significance as defined as to the Formula I.

This process is performed by mixing the above-named two starting materials at a suitable ratio, preferably at equimolar ratio, and heating the mixture after optional addition of condensing agent. The preferred temperature for this reaction is between 130° and 230° C. This reaction may also be performed with boiling under reflux in an inert solvent, such as monochlorobenzene, dichlorobenzene, xylene or cumene. It is particularly advantageous to perform this reaction while removing the water as formed from the system by any suitable means. As the useful condensing agent, phosphorus oxychloride, phosphorus pentachloride, polyphosphoric acid, boric acid, zinc chloride, zinc bromide and sodium hydrogensulphate or organic acid such as p-toluenesulphonic acid may be named.

The 2-methylbenzazole compounds of the Formula V which are the starting material of this alternative process can also be the starting material of the aforementioned 2-(4'-aminostyryl)-benzazole compounds of the Formula III. The 2-methylbenzazole compounds include:

2-methylbenzoxazole
2,5-dimethylbenzoxazole
2,6-dimethylbenzoxazole
2,7-dimethylbenzoxazole
5-ethyl-2-methylbenzoxazole
5-n-propyl-2-methylbenzoxazole
5-iso-propyl-2-methylbenzoxazole
5-tert.-butyl-2-methylbenzoxazole
5-tert.-octyl-2-methylbenzoxazole
2,5,6-trimethylbenzoxazole
2,5,7-trimethylbenzoxazole
5-ethyl-2,6-dimethylbenzoxazole
5-phenyl-2-methylbenzoxazole
5-methoxy-2-methylbenzoxazole
5-cyclohexyl-2-methylbenzoxazole
4,5-cyclotetramethylene-2-methylbenzoxazole
5-chloro-2-methylbenzoxazole
2-methylbenzothiazole
2,6-dimethylbenzothiazole
6-methoxy-2-methylbenzothiazole
6-chloro-2-methylbenzothiazole Examples of 4-[1',2',3'-triazolyl-(2')]-benzaldehydes of the Formula VIII include:

4-[5'-methyl-6'-methoxy-1',2',3'-benzotriazolyl-(2')]-benzaldehyde
4-[5',6'-dimethyl-1',2',3'-benzotriazolyl-(2')]-benzaldehyde
4-[5',6'-dimethoxy-1',2',3'-benzotriazolyl-(2')]-benzaldehyde
4-[5'-methyl-6'-ethoxy-1',2',3'-benzotriazolyl-(2')]-benzaldehyde
4-[naphtho-(1",2":4',5')-1',2',3'-triazolyl-(2')]-benzaldehyde
4-[naphtho-(1",2":4',5')-1',2',3'-triazolyl-(2')]-2-chlorobenzaldehyde
4-[naphtho-(1",2":4',5')-1',2',3'-triazolyl-(2')]-2-chlorobenzaldehyde
4-[acenaphtheno-(4",5":4',5')-1',2',3'-triazolyl-(2')]-benzaldehyde Derivatives of these 4-[1',2',3'-triazolyl-(2')]-benzaldehydes can be prepared, for example, from corresponding 4-[1',2',3'-triazolyl-(2')]-benzoic acid derivatives via 2-sulphonylhydrazide. (Cf. E. Mosettig, Organic Reactions, vol. 8, p. 222 (1954).)

Besides the above-described two processes for the preparation of the 2-styrylazole compound of the Formula I of this invention, there still is another process as follows. To wit, the compound may also be prepared by condensing an aniline derivative of the general Formula IX:

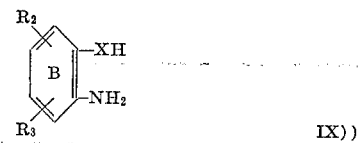

(IX)

in which B, $R_2$, $R_3$ and X each has the significance as defined as to the Formula I having XH group and amino group at adjacent positions, with 4-triazolyl cinnamic acid or its derivatives of the Formula X:

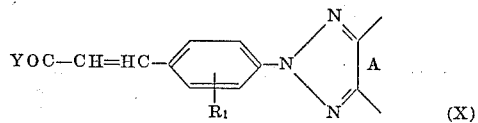

(X)

in which A and $R_1$ each has the significance as defined as to the Formula I, and Y is selected from the group consisting of hydroxyl group, alkoxy group, amino group and halogen, to cause the ring closure.

This process is performed by mixing the above two starting materials at a suitable ratio, preferably at equimolar ratio, and heating the mixture after optional addition of condensing agent. The preferred temperature for this reaction lies between 130° and 200° C., and the reaction may be performed with boiling under reflux in an inert solvent, such as monochlorobenzene, dichlorobenzene, xylene or cumene. The water or alcohol formed during the reaction should be successively removed from the system with particular advantage. As the useful condensing agent, phosphorus oxychloride, phosphorus pentachloride, polyphosphoric acid, boric acid, zinc chloride, zinc bromide and sodium hydrogensulphate, or organic acid such as p-toluenesulphonic acid may be named.

The condensation reaction presumably is a two-stage reaction as shown by the formulae below. While in the general formula XI, —OC group is shown as bonded with —X— group and —NH— group, with hydrogen, it is also possible that on the contrary —OC— group is bonded with —NH— group and —X— group, with hydrogen. The difference in the bonding pattern is caused by different starting materials and reaction conditions, but in either case at the final stage the novel 2-styrylazole compound of the Formula I is formed.

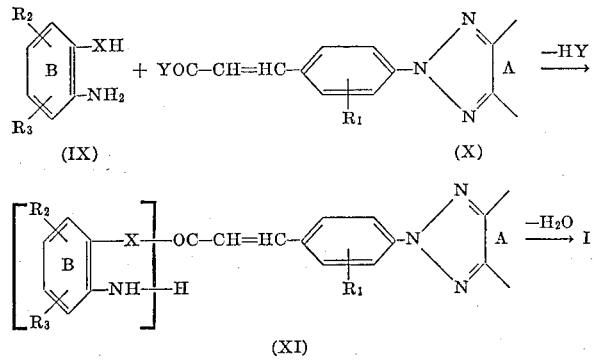

Examples of the aniline derivatives represented by the general Formula IX include:

2-aminophenol
3-methyl-2-aminophenol
4-methyl-2-aminophenol
5-methyl-2-aminophenol
6-methyl-2-aminophenol
4-ethyl-2-aminophenol
4-n-propyl-2-aminophenol
4-iso-propyl-2-aminophenol
4-tert.-butyl-2-aminophenol
4-tert.-octyl-2-aminophenol
4,5-dimethyl-2-aminophenol
4,6-dimethyl-2-aminophenol
4-ethyl-5-methyl-2-aminophenol
4-phenyl-2-aminophenol
4-methoxy-2-aminophenol
4-cyclohexyl-2-aminophenol
3,4-cyclotetramethylene-2-aminophenol
4-chloro-2-aminophenol
2-aminothiophenol
5-methyl-2-aminothiophenol
5-chloro-2-aminothiophenol.

As the examples of the 4-triazolyl cinnamic acid of the Formula X, the following may be named. It should of course be understood that the derivatives of these compounds are also useful in the present process.

4-[naphtho - (1″,2″:4′,5′) - 1′,2′,3′ - triazolyl - (2′)]-cinnamic acid
4-[5′ - methyl - 6′ - methoxy - 1′,2′,3′ - benzotriazolyl-(2′)]-cinnamic acid
4-[5′ - methyl - 6′ - ethoxy - 1′,2′,3′, - benzotriazolyl-(2′)]-cinnamic acid
4-[5′,6′ - dimethyl - 1′,2′,3′ - benzotriazolyl-(2′)]-cinnamic acid
4-[5′,6′ - dimethoxy - 1′,2′,3′ - benzotriazolyl - (2′)]-cinnamic acid
4-[acenaphtheno - (4″,5″:4′,5′) - 1′,2′,3′ - triazolyl-(2′)]-cinnamic acid These 4-triazolyl cinnamic acids can be obtained, for example, by the steps of coupling the diazotized compounds resulted from diazotization of 4-aminocinnamic acid or its derivatives with the amino compound corresponding to A of the Formula X to form o-aminoazo compound, and causing the triazole ring closure of the same in accordance with the method described as to the o-aminoazo compound of the formula IV.

Examples of the novel 2-styrylazole compound of this invention prepared by the above described various processes are given in the following Table 1.

TABLE 1

| No. | Structural formula | Property (M.P., °C.) | Fluorescent Color (benzene solution) |
|---|---|---|---|
| 1 | | Very light yellow prismatic crystal (244–245). | Blue violet. |
| 2 | | Light yellow fine crystal (264.5–265.5). | Do. |
| 3 | | Very yight yellow fine crystal (290.5–292.) | Do. |
| 4 | | Very light yellow prismatic crystal (263–264.). | Do. |
| 5 | | Light yellow flaky crystal (253–254). | Do. |

TABLE 1—Continued

| No. | Structural formula | Property (M.P., °C.) | Fluorescent Color (benzene solution) |
|---|---|---|---|
| 6 | (benzothiazole)-C=CH-CH=CH-(phenyl)-N(benzotriazole-OCH₃, CH₃) | Yellow fine crystal (259–260). | Blue. |
| 7 | H₃CO-(benzoxazole)-C=CH-HC=(phenyl-Cl)-N(acenaphtho-triazole) | Yellow fine crystal (>310). | Greenish blue. |
| 8 | (benzoxazole)-C-H-HC=(phenyl)-N(acenaphtho-triazole) | Light yellow prismatic crystal (259–260). | Blue violet. |
| 9 | CH₃-(benzoxazole)-C-CH=HC-(phenyl)-N(benzotriazole-CH₃, CH₃) | Orange powder (271.5–272.5). | Violet. |
| 10 | CH₃-(benzoxazole)-C-CH=HC-(phenyl)-N(benzotriazole-OC₂H₅, CH₃) | Light yellow prismatic crystal (218.5–219.5). | Blue violet. |
| 11 | (benzoxazole-CH₃)-C-CH=HC-(phenyl)-N(benzotriazole-OCH₃, CH₃) | Light yellow needle-like crystal (254.5–255.5). | Do. |
| 12 | CH₃-(benzoxazole)-C-CH=HC-(phenyl)-N(benzotriazole-OCH₃, CH₃) | Yellow prismatic crystal (256–257). | Do. |
| 13 | CH₃-(benzoxazole)-C-CH=HC-(phenyl)-N(benzotriazole-OCH₃, CH₃) | Light yellow fine crystal (237–238). | Do. |
| 14 | CH₃CH₂-(benzoxazole)-C-CH=HC-(phenyl)-N(benzotriazole-OCH₃, CH₃) | Light yellow, long needle-like crystal (226–227). | Do. |
| 15 | CH₃CH₂CH₂-(benzoxazole)-C-CH=HC-(phenyl)-N(benzotriazole-OCH₃, CH₃) | Yellow platy crystal (207–208). | Do. |
| 16 | (CH₃)₂CH-(benzoxazole)-C-CH=HC-(phenyl)-N(benzotriazole-OCH₃, CH₃) | Yellow prismatic crystal (214–215). | Do. |

TABLE 1—Continued

| No. | Structural formula | Property (M.P., ° C.) | Fluorescent Color (benzene solution) |
|---|---|---|---|
| 17 | (structure) | Light yellow flaky crystal (258.5–259). | Do. |
| 18 | (structure) | Yellow platy crystal (261–261.5). | Do. |
| 19 | (structure) | Light yellow needle-like crystal (231–232). | Do. |
| 20 | (structure) | Light yellow, fine needle-like crystal (229–229.5). | Do. |
| 21 | (structure) | Light yellow prismatic crystal (>300). | Violet blue. |
| 22 | (structure) | Yellow prismatic crystal (266–267.5). | Do. |
| 23 | (structure) | Light yellow platy crystal (248–249). | Do. |
| 24 | (structure) | Yellow needle-like crystal (269.5–270.5). | Do. |
| 25 | (structure) | Orange yellow flaky crystal (237.5–238.5). | Do. |
| 26 | (structure) | Yellow, fine prismatic crystal (228.5–229.5). | Blue violet. |

TABLE 1—Continued

| No. | Structural formula | Property (M.P., °C.) | Fluorescent Color (benzene solution) |
|---|---|---|---|
| 27 | [structure: 5,7-dimethylbenzoxazole–CH=CH–phenyl–N-naphthotriazole] | Light yellow, narrow needle-like crystal 241–242. | Do. |
| 28 | [structure: 5,7-dimethylbenzoxazole–CH=CH–(Cl-substituted phenyl)–N-benzotriazole with OCH₃ and CH₃] | Orange yellow, fine crystal (251–252). | Blue. |
| 29 | [structure: 5,7-dimethylbenzoxazole–CH=CH–phenyl–N-benzotriazole with two OCH₃] | Yellow prismatic crystal (223–224). | Blue violet. |
| 30 | [structure: 5-ethylbenzoxazole–CH=CH–phenyl–N-benzotriazole with two OCH₃] | Yellow needle-like crystal (226.5–227.5). | Do. |

The optical brightening of the aforenamed synthetic fibers in accordance with the present invention can be performed by treating the fibrous material with the novel 2-styrylazole compound of the general formula I, in the manner of accepted dyeing practice with known, conventional disperse dyes. In such an occasion, it is preferred that the 2-styrylazole compound should be dispersed in water with the aid of suitable surfactant, and that the material to be treated be immersed in that dispersion. As suitable surfactant, those of anion type such as sodium alkylbenzene sulphonate, condensate of naphthalene sulphonic acid with formaldehyde and sulfuric acid ester of higher alcohol; or of non-ionic type such as polyoxyethylene alkyl ether or polyoxyethylene alkylaryl ether, may be used. The brightening effect of polyolefin-type synthetic fibers can be notably enhanced by addition of non-ionic surfactant to the treating bath. The preferred amount of the surfactant ranges from 0.5–5 g. per liter of the bath. The treating temperature in the dispersion required ranges from 50° C. to around 130° C. depending on the type of the fibrous material to be treated. In treating polyester type fibers, the brightening effect can be further improved by adding so-called carrier, such as trichlorobenzene or methyl salicylate, to the treating bath. For treating polyester fabrics or cotton-blended polyester fabrics, it is advantageous to apply an aqueous dispersion containing a compound of the Formula I and a surfactant uniformly onto the fabric to be treated, following the manner of pigment padding, and thereafter to subject the fabric to a dry-heat treatment. Particularly preferred treating temperature for such a practice lies between 160°–220° C.

As an alternative process, optically brightened synthetic fibers may be obtained by spinning the polymer in which a 2-styrylazole compound of the Formula I is incorporated.

In employing the novel 2-styrylazole compound of the Formula I of this invention for optical brightening of organic fibrous material, the novel compound should preferably be blended with the aforementioned surfactants in advance to take the form of power or liquid dispersion composition which is diluted in the dyeing bath at the time of use. When the composition is powdery, an anion-tape surfactant is used in an amount ranging about 5–20 times that of the compound used. Whereas, in case the composition is a liquid dispersion, it is in order that the amount of the novel compound contained in the dispersion should be about 1–10%, and that of the surfactant 10–20%. As the surfactant those of anion type or non-ionic type may be used. The novel compound which is to serve as the starting material of such a composition should preferably be first made into primary particles as granulated in accordance with so-called acid-paste process well known in relation to conventional disperse dyes, and then be thoroughly mixed with the surfactant by a suitable means, for example, a grinder or a mixer such as colloid mill.

In practicing the optical brightening treatment of organic fibrous material in accordance with the present invention, the suitable amount for use of the novel 2-styrylazole compound of the Formula I ranges 0.01–0.5% by weight, preferably 0.02–0.1%, of the fibrous material to be treated.

Hereinafter the processes for the preparation of the novel 2-styrylazole compound of this invention and the process for optical brightening of organic fibrous material using such compound are illustrated with working examples in which parts and percentages are all on weight basis.

Example 1

2-(4'-aminostyryl)-5-methylbenzoxazole was diazotized with hydrochloric acid and sodium nitrite as in the accepted practice, and the resultant diazo compound was reacted with 3-methoxy-4-methylaniline as in the accepted practice to form the corresponding o-aminoazo compound. 6.7 parts of the o-aminoazo compound was thrown into 80 parts of pyridine, followed by the further addition thereto of 7 parts cupric chloride ($CuCl_2 \cdot 2H_2O$), 4 parts anhydrous sodium acetate and 5 parts water. The resultant mixture was boiled for 6 hours under reflux. Thus formed reaction product was put into 500 parts cold water containing 110 parts conc. hydrochloric acid, stirred thoroughly, filtered, washed with water and dried. The crude product so obtained was purified by means of recrystallization from pyridine or o-dichlorobenzene to yield light yellow, prismatic crystal (M.P. 264.5–265.5) which was the following structural formula and of which benzene solution emits strong blue violet fluorescence under daylight.

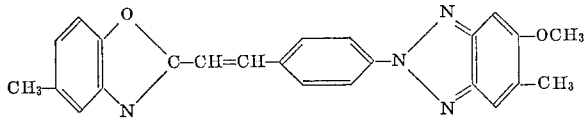

The 2-(4'-aminostyryl)-5-methylbenzoxazole used in this example was synthesized as follows.

An equimolar mixture of 2,5-dimethylbenzoxazole and p-nitrobenzaldehyde was mixed with 0.5 mol of zinc chloride, and then heated to 160–200° C. for 8 hours.

The product was pulverized, boiled with methanol and cooled, and by filtering the so formed crystalline precipitate, light yellow crystal of 2(4'-nitrostyryl)-5-methylbenzoxazole was obtained. The same was reduced with iron powder and hydrochloric acid in methyl cellosolve to yield dark yellow, platy crystal of 2-(4'-aminostyryl)-5-methylbenzoxazole (M.P. 183–184° C.) of which benzene solution emits weak blue green fluorescence under ultraviolet light.

Example 2

An o-aminoazo compound was prepared as an Example 1 except the replacement of 3-methoxy-4-methylaniline by 2-naphthylamine. Using 6.9 parts of the o-aminoazo compound, the operations of Example 1 were repeated to produce the compound having the following structural formula (light yellow, flaky crystal, M.P. 253–254° C.). The benzene solution of the product emits strong blue violet fluorescence under daylight.

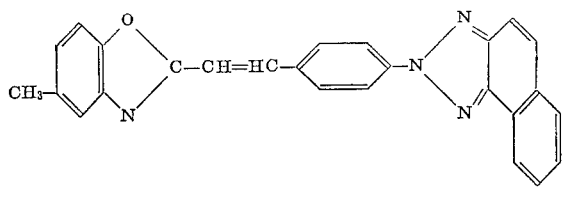

Example 3

1.5 parts of 2-(4'-amino-2'-chlorostyryl)-5-methoxybenzoxazole was dissolved in 10 parts acetic acid at an elevated temperature, and to the solution was added 1 part conc. hydrochloric acid, followed by cooling to 0° C. Ice blocks were then added thereto, and the compound was diazotized with 0.36 part sodium nitrite. After completion of the diazotization, excessive nitrous acid was decomposed with sulphamic acid. Separately, 0.76 part 5-aminoacenaphthene was heated with 5 parts acetic acid, to which then 0.5 part conc. hydrochloric acid and 20 parts water were added with thorough stirring, and insoluble matter was removed by filtration if any. Thus obtained solution of 5-aminoacenaphthene was cooled to 10° C. or below thereto of ice blocks, and thereafter the aforesaid diazo solution was added thereto followed by thorough stirring. To the mixture then an aqueous solution containing 1.5 parts sodium acetate (as anhydride) was added, again followed by several hours of stirring, to yield the o-aminoazo dyestuff of the following structural formula.

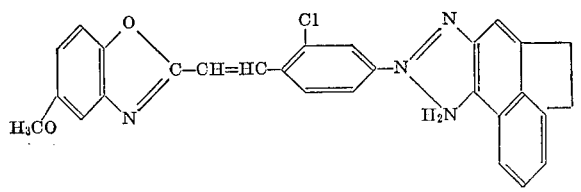

This dyestuff was separated by filtration, thoroughly washed with water, and the cake was compressed to have a water content of about 50%. To the same, 30 parts pyridine, 2 parts cupric chloride and 2 parts anhydrous sodium acetate were added, and the mixture was boiled for 2 hours under reflux. The reaction product was discharged into a large quantity of water containing 40 parts conc. hydrochloric acid, mixed well, separated by filtration, thoroughly washed with water, and then was dried. The product was then dissolved in o-dichlorobenzene and purified with active carbon. By the subsequent recrystallization thereof, yellow, fine prismatic crystal (M.P. >310° C.) was obtained, which has the following structural formula and of which benzene solution emits strong greenish blue fluorescence under daylight.

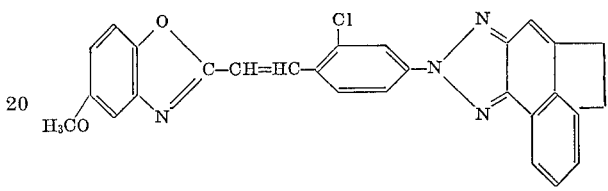

The 2 - (4' - amino - 2' - chlorostyryl) - 5 - methoxybenzoxazole used in this example is yellowish brown crystal of M.P. 173.5–174.5° C., and was prepared by reduction of 2 - (4' - nitro - 2' - chlorostyryl) - 5 - methoxybenzoxazole which was in turn obtained from 2-methyl-5-methoxybenzoxazole and 2-chloro-4-nitrobenzaldehyde.

Example 4

Example 1 was repeated except that 2-(4'-aminostyryl)-5-methylbenzoxazole was replaced by 2-(4'-aminostyryl)-5-chlorobenzoxazole (M.P. 194.5–196° C.), to produce the compound of the structural formula below. The compound has a M.P. 290.5–292° C., and of which benzene solution emits strong blue violet fluorescence under daylight.

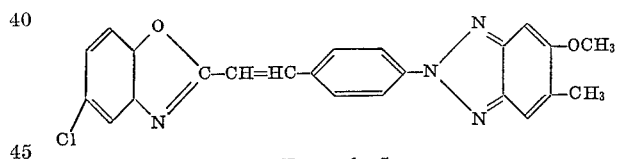

Example 5

A filtered cake (water content about 50%) of the o-aminoazo compound obtained from the diazotization product of 2.64 parts 2-(4'-aminostyryl)-5-ethylbenzoxazole, and 1.4 parts 4-amino-2-methoxytoluene was thrown into 20 parts pyridine, added with 4 parts copper acetate and was stirred for 6 hours under reflux. After the subsequent cooling, the precipitated reaction product was separated by filtration and washed with methanol. Thus obtained crude product was dissolved in pyridine or o-dichlorobenzene and purified with active carbon, followed by recrystallization. Light yellow, needle-like crystals M.P. 226–227° C.) was obtained, which has the structural formula below and of which benzene solution emits strong blue violet fluorescence under daylight.

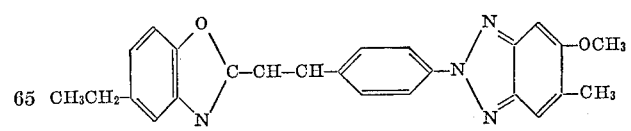

Example 6

16.1 parts of 5-ethyl-2-methylbenzoxazole, 26.7 parts 4-[5' - methyl - 6' - methoxy - 1', 2', 3' - benzotriazolyl-(2')]-benzaldehyde and 5 parts zinc chloride were reacted with stirring for 8 hours at 160–180° C. Cooling the system, the reaction product was finely divided, boiled with 50 parts methanol, washed with water and recrystallized from pyridine or o-dichlorobenzene. Light yellow, needle-like crystal (M.P. 226–227° C.) resulted, which is the same as the product obtained in Example 5.

Example 7

3.2 parts of 4-[naphtho-(1″,2″:4′,5′)-1′,2′,3′-triazolyl-(2′)]-cinnamic acid was heated and dissolved with 50 parts o-dichlorobenzene and 3 parts phosphorus pentachloride. To the solution was added 1.25 parts 4-methyl-2-aminophenol, followed by 8 hours of reflux at 160–180° C. After completion of the reaction, equal volume of methanol was added to the system and the system was subsequently cooled. Thus precipitated crystalline reaction product was separated by filtration, and was recrystallized from pyridine to yield light yellow crystal (M.P. 253–254° C.) which is the same as the product of Example 2.

Example 8

One part of the compound obtained in Example 2 was well blended with 19 parts alkylbenzene sulphonic acid-type surfactant, and 0.2 part of the blend was added to 500 parts of treating bath containing one part of sulphuric acid ester of higher alcohol-type surfactant. Into so prepared treating bath 10 parts of polyethylene terephthalate fibers was immersed, and treated for 60 minutes at 120° C. Conspicuous brightening effect was observed on the treated fibers which were washed with water and dried after the treatment, as compared with the untreated fibers.

Similar brightening effect of the same fibers was obtained using either of the following two compounds, the treating procedures being the same in all cases.

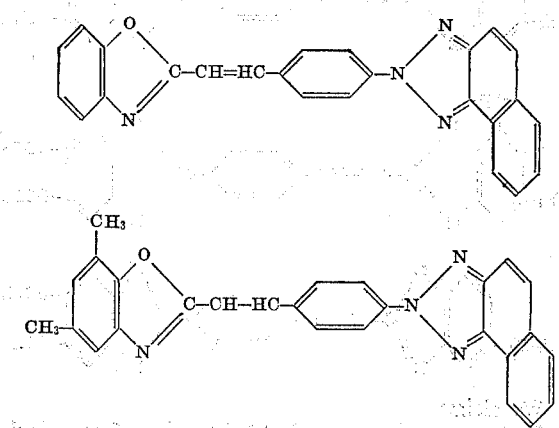

Example 9

A conspicuous brightening effect of polypropylene fibers was obtained by treating the said fibers with the compound of the formula below as in Example 8. When the treating temperature was lowered to 100° C., similar result was obtained.

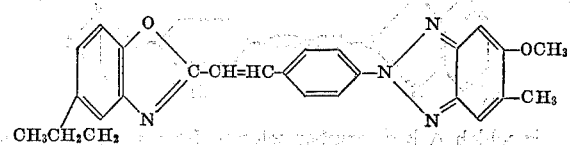

Example 10

Particularly satisfactory brightening effect was achieved by using a non-ionic surface activator such as polyoxyethylene alkylether as the surface activator to be added to the treating bath of Example 9.

The similar effect can be obtained with the use of either of the two compounds having the structural formulae below.

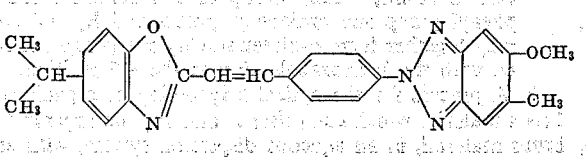

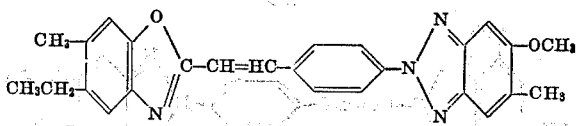

Example 11

Two parts of the compound of the following structural formula

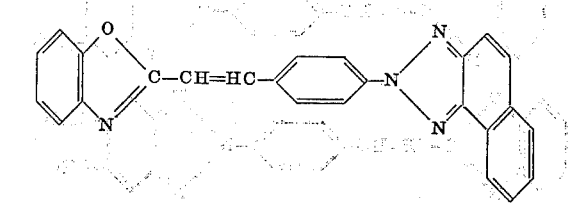

was well blended with 18 parts of alkylbenzene sulphonic acid-type surfactant. The resultant blend was added to the treating bath containing 2 parts of carboxymethyl cellulose to make the total thereof 1000 parts. Into thus prepared treating bath polyester fabric was immersed and subjected to pigment padding with a pick up of 40–50%. After drying, the fabric was heat-treated at 190–200° C. for 1 minute. The fabric was then soap-washed, water-washed and dried, on which conspicuous brightening effect was observed compared with the untreated fabric.

Example 12

Three parts of the compound of the following structural formula

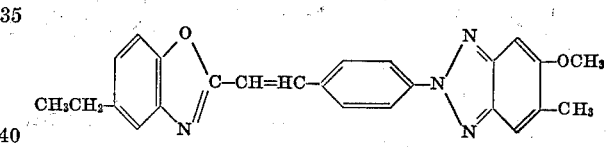

was dissolved in 36 parts of sulphuric acid (90%) at room temperature, and the solution was discharged into a mixture consisting of 90 parts water and 90 parts ice with stirring. Thus formed precipitate was separated by filtration, washed with water, neutralized with a diluted aqueous solution of caustic soda, and again washed with water. Thus obtained wet cake was blended with 10 parts polyoxyethylene alkylether-type surfactant, added with water to make the total quantity of the blend 100 parts, and then was put in a colloid mill for still thorough blending.

In a treating bath consisting of 2 parts of the aqueous dispersion-type composition obtained in the above, 10 parts of polyoxyethylene alkylether-type surfactant and 5000 parts of water, 100 parts of polypropylene fibers was immersed and treated at 100° C. for 40 minutes. When the fibers were subsequently water-washed and dried, conspicuous brightening effect was observed thereon compared with untreated fibers.

By the similar procedures, treating baths each containing one of the following compounds were prepared and employed for the similar treatment of polypropylene fibers, with similar brightening effect.

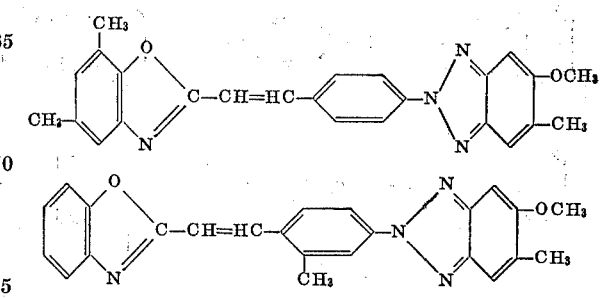

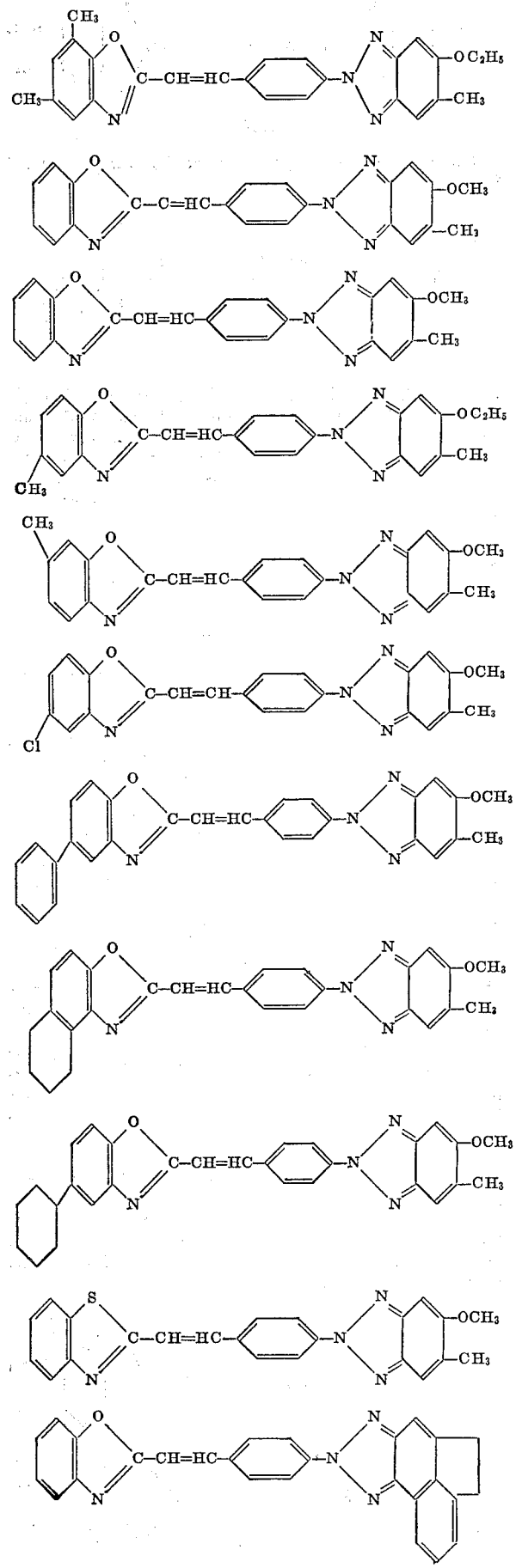
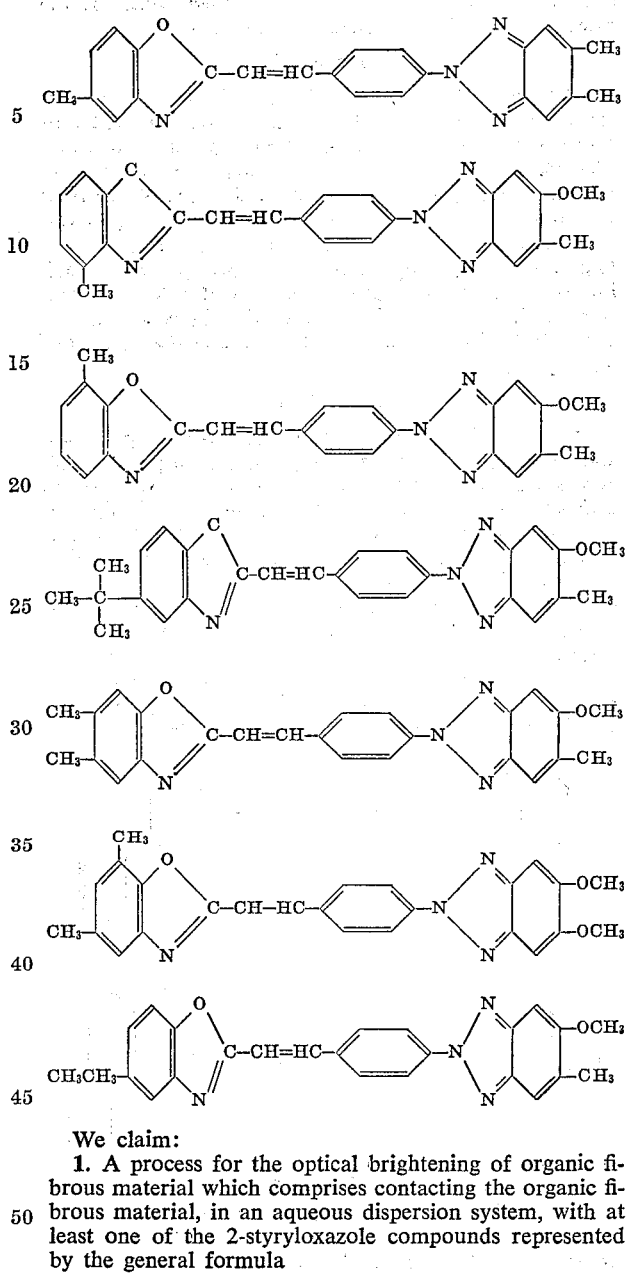

We claim:
1. A process for the optical brightening of organic fibrous material which comprises contacting the organic fibrous material, in an aqueous dispersion system, with at least one of the 2-styryloxazole compounds represented by the general formula

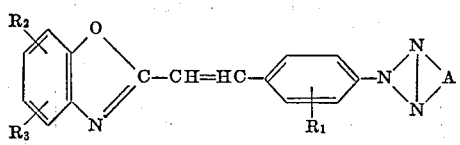

in which A is a member selected from the group consisting of di-lower alkyl-o-phenylene group, di-lower alkoxy-o-phenylene group, lower alkyl-lower alkoxy-o-phenylene group, 1,2 naphthylene group and 4,5-acenaphthenylene group, $R_1$ is a member selected from the group consisting of hydrogen, chlorine and methyl group, and $R_2$ and $R_3$ are each a member selected from the group consisting of hydrogen, chlorine, alkyl group of 1–8 carbon atoms, alkoxy group of 1–4 carbon atoms, phenyl group and cyclohexyl group, and $R_2$ and $R_3$ may together form cyclotetramethylene group bonded with the benzoxazole ring at the 4,5-position.

2. A process for the optical brightening of organic fibrous material which comprises contacting the organic fibrous material, in an aqueous dispersion system, with at least one of the 2-styryloxazole compounds represented by the general formula

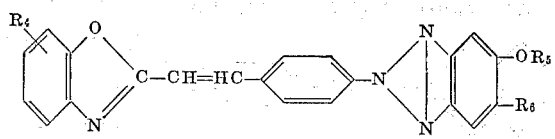

in which R₄ stands for an alkyl group of 1–8 carbon atoms, and R₅ and R₆ each stands for an alkyl group of 1–4 carbon atoms.

3. A process for the optical brightening of organic fibrous material which comprises contacting the organic fibrous material, in an aqueous dispersion system, with 2-styryloxazole compound of the structural formula

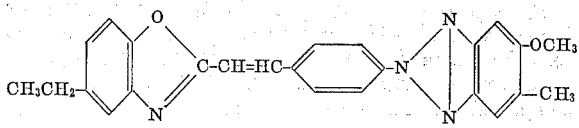

4. A process for the optical brightening of organic fibrous material which comprises contacting the organic fibrous material, in an aqueous dispersion system, with 2-styryloxazole compound of the structural formula

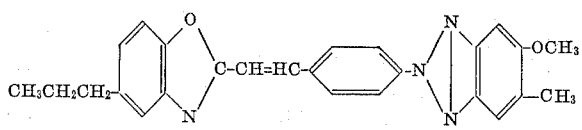

5. A process for the optical brightening of organic fibrous material which comprises contacting the organic fibrous material, in an aqueous dispersion system, with 2-styryloxazole compound of the structural formula

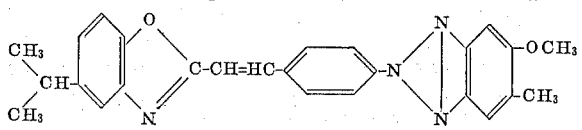

6. A process for the optical brightening of organic fibrous material which comprises contacting the organic fibrous material, in an aqueous dispersion system, with 2-styryloxazole compound of the structural formula

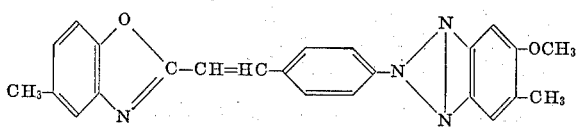

7. A process for the optical brightening of organic fibrous material which comprises contacting the organic fibrous material, in an aqueous dispersion system, with 2-styryloxazole compound of the structural formula

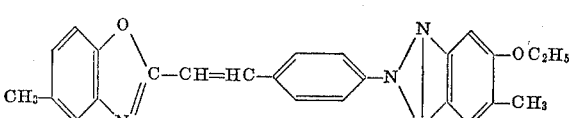

8. A process for the optical brightening of organic fibrous material which comprises contacting the organic fibrous material, in an aqueous dispersion system, with 2-styryloxazole compound of the structural formula

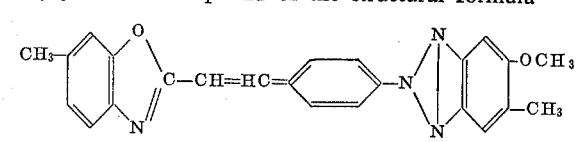

9. A process for the optical brightening of organic fibrous material which comprises contacting the organic fibrous material, in an aqueous dispersion system, with at least one of the 2-styryloxazole compounds represented by the general formula

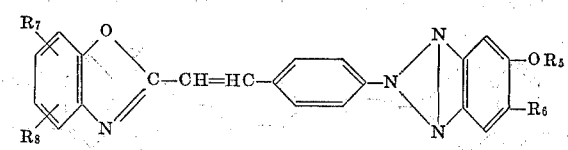

in which:
R₅ and R₆ each stands for an alkyl group of 1–4 carbon atoms,
R₇ and R₈ each stands for an alkyl group of 1–8 carbon atoms, and may together form cyclotetramethylene group bonded with the benzoxazole ring at the 4,5-position.

10. A process for the optical brightening of organic fibrous material which comprises contacting the organic fibrous material, in an aqueous dispersion system, with 2-styryloxazole compound of the structural formula

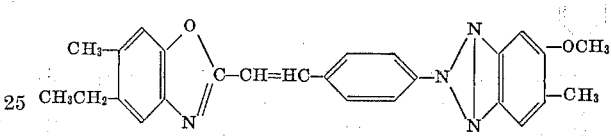

11. A process for the optical brightening of organic fibrous material which comprises contacting the organic fibrous material, in an aqueous dispersion system, with 2-styryloxazole compound of the structural formula

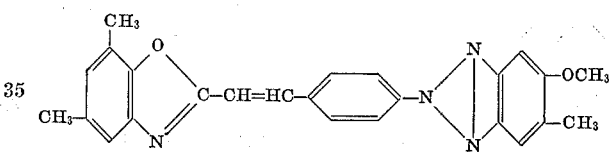

12. A process for the optical brightening of organic fibrous material which comprises contacting the organic fibrous material, in an aqueous dispersion system, with 2-styryloxazole compound of the structural formula

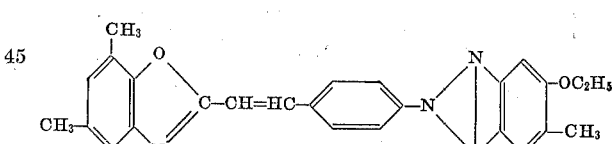

13. A process for the optical brightening of organic fibrous material which comprises contacting the organic fibrous material, in an aqueous dispersion system, with 2-styryloxazole compound of the structural formula

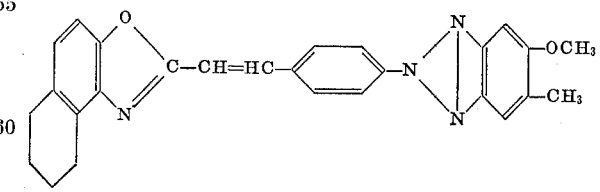

14. A process for the optical brightening of organic fibrous material which comprises contacting the organic fibrous material, in an aqueous dispersion system, with 2-styryloxazole compound of the structural formula

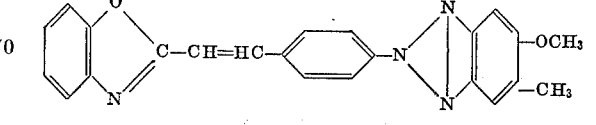

15. A process for the optical brightening of organic fibrous material which comprises contacting the organic fibrous material, in an aqueous dispersion system, with 2-styryloxazole compound of the structural formula

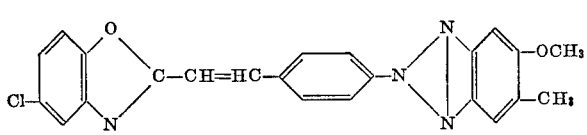

16. A process for the optical brightening of organic fibrous material which comprises contacting the organic fibrous material, in an aqueous dispersion system, with 2-styryloxazole compound of the structural formula

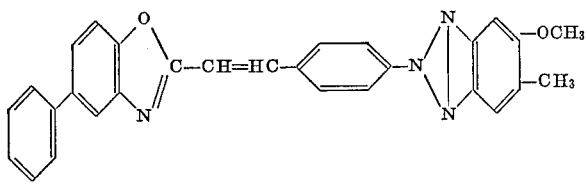

17. A process for the optical brightening of organic fibrous material which comprises contacting the organic fibrous material, in an aqueous dispersion system, with 2-styryloxazole compound of the structural formula

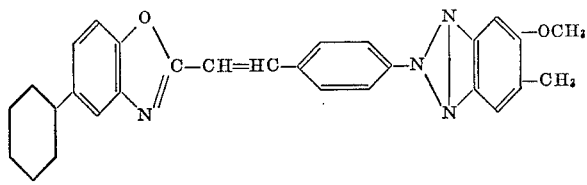

18. A process for the optical brightening of organic fibrous material which comprises contacting the organic fibrous material, in an aqueous dispersion system, with 2-styryloxazole compound of the structrual formula

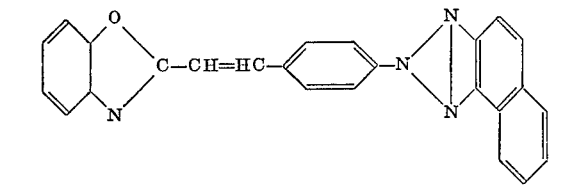

19. A process for the optical brightening of organic fibrous material which comprises contacting the organic fibrous material, in an aqueous dispersion system, with 2-styryloxazole compound of the structural formula

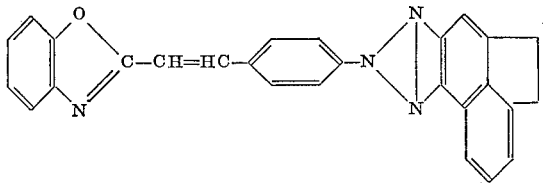

20. The process of claim 1 in which the organic fibrous material is polypropylene fibers.

21. The process of claim 1 in which the organic fibrous material is polyester fibers.

22. A process for the optical brightening of polyester fibrous material which comprises contacting the fibrous material containing polyester fibers with an aqueous dispersion containing at least one of the 2-styryloxazole compounds represented by the general formula

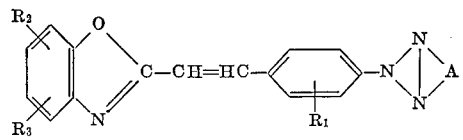

in which:
A is a member selected from the group consisting of di-lower alkyl-o-phenylene group, di-lower-alkoxy-o-phenylene group, lower alkyl-lower alkoxy-o-phenylene group, 1,2-naphthylene group and 4,5-acenaphthenylene group,
$R_1$ is a member selected from the group consisting of hydrogen, chlorine and methyl group, and
$R_2$ and $R_3$ are each a member selected from the group consisting of hydrogen, chlorine, alkyl group of 1–8 carbon atoms, alkoxy group of 1–4 carbon atoms, phenyl group and cyclohexyl group, and $R_2$ and $R_3$ may together form cyclotetramethylene group bonded with the benzoxazole ring at the 4,5-position,
drying the said material and thereafter heating the same at a temperature within the range of 160–220° C.

References Cited

UNITED STATES PATENTS

| | | |
|---|---|---|
| 2,713,056 | 7/1955 | Sartori. |
| 3,158,610 | 11/1964 | Buell. |
| 3,316,180 | 4/1967 | Strobel et al. |

ALFRED L. LEAVITT, *Primary Examiner.*

ROGER L. BROWDY, *Assistant Examiner.*